(12) United States Patent
Nakagawa et al.

(10) Patent No.: US 8,721,244 B2
(45) Date of Patent: May 13, 2014

(54) CONNECTED FASTENER ASSEMBLY

(75) Inventors: Yasushi Nakagawa, Chuo-ku (JP);
Hiroki Yamamoto, Chuo-ku (JP);
Takamichi Hoshino, Chuo-ku (JP);
Kazuhisa Takeuchi, Chuo-ku (JP)

(73) Assignee: Max Co., Ltd., Tokyo (JP)

( * ) Notice: Subject to any disclaimer, the term of this patent is extended or adjusted under 35 U.S.C. 154(b) by 916 days.

(21) Appl. No.: 12/265,415

(22) Filed: Nov. 5, 2008

(65) Prior Publication Data
US 2009/0129890 A1   May 21, 2009

(30) Foreign Application Priority Data

Nov. 6, 2007   (JP) .................................. 2007-288920

(51) Int. Cl.
*F16B 15/08*   (2006.01)

(52) U.S. Cl.
CPC ...................................... *F16B 15/08* (2013.01)
USPC .......................................... 411/442; 206/347

(58) Field of Classification Search
USPC ................... 411/442, 443, 441; 206/345–347
See application file for complete search history.

(56) References Cited

U.S. PATENT DOCUMENTS

| | | | | | |
|---|---|---|---|---|---|
| 159,777 | A | * | 2/1875 | Sturtevant | 206/345 |
| 354,462 | A | * | 12/1886 | Copeland | 206/345 |
| 2,784,405 | A | * | 3/1957 | Working, Jr. | 206/346 |
| 3,167,778 | A | * | 2/1965 | Decot et al. | 206/345 |
| 3,442,374 | A | * | 5/1969 | Hillier | 206/344 |
| 3,498,172 | A | * | 3/1970 | Thurner | 411/441 |
| 3,768,124 | A | * | 10/1973 | Maynard | 24/308 |
| 4,106,618 | A | * | 8/1978 | Haytayan | 206/343 |
| 4,383,608 | A | * | 5/1983 | Potucek | 206/347 |
| 4,913,611 | A | | 4/1990 | Leistner | |
| 4,915,223 | A | * | 4/1990 | Fischer | 206/345 |
| 4,932,821 | A | * | 6/1990 | Steffen et al. | 411/442 |
| 4,971,503 | A | * | 11/1990 | Barnell et al. | 411/443 |
| 5,730,570 | A | * | 3/1998 | Buhofer et al. | 411/441 |
| 6,779,959 | B1 | * | 8/2004 | Yang | 411/443 |
| 7,516,841 | B2 | * | 4/2009 | Uejima et al. | 206/338 |
| 2009/0114559 | A1 | * | 5/2009 | Nakagawa et al. | 206/347 |

FOREIGN PATENT DOCUMENTS

| | | |
|---|---|---|
| JP | 47-36065 | 9/1972 |
| JP | 50-148752 | 11/1975 |
| JP | 51-160770 | 12/1976 |
| JP | 51-162159 | 12/1976 |
| JP | 57-6109 | 1/1982 |
| JP | 57-120713 | 7/1982 |
| JP | 59-157108 | 10/1984 |
| JP | 63-53429 | 4/1988 |
| JP | 3-9107 | 1/1991 |
| JP | 5-83425 | 11/1993 |

(Continued)

OTHER PUBLICATIONS

Taiwanese Office Action in Application No. 097142038 dated Aug. 26, 2013.

*Primary Examiner* — Flemming Saether
(74) *Attorney, Agent, or Firm* — Drinker Biddle & Reath LLP

(57) ABSTRACT

In a connected fastener assembly, the shaft sections of multiple fasteners are connected using a connecting band made of a synthetic resin. Retaining sections for allowing the shaft sections of the fasteners to be inserted therein and connecting sections for connecting the adjacent retaining sections are formed continuously. The connecting sections are offset from the center line "a" connecting the centers of the adjacent fasteners (retaining sections).

8 Claims, 12 Drawing Sheets

(56) References Cited

FOREIGN PATENT DOCUMENTS

| | | |
|---|---|---|
| JP | 6-12246 | 2/1994 |
| JP | 6-35623 | 5/1994 |
| JP | 2526455 | 11/1996 |
| JP | 2005-090723 | 4/2005 |
| TW | 452025 U | 8/2001 |
| WO | WO 2005/028160 A2 | 3/2005 |

* cited by examiner

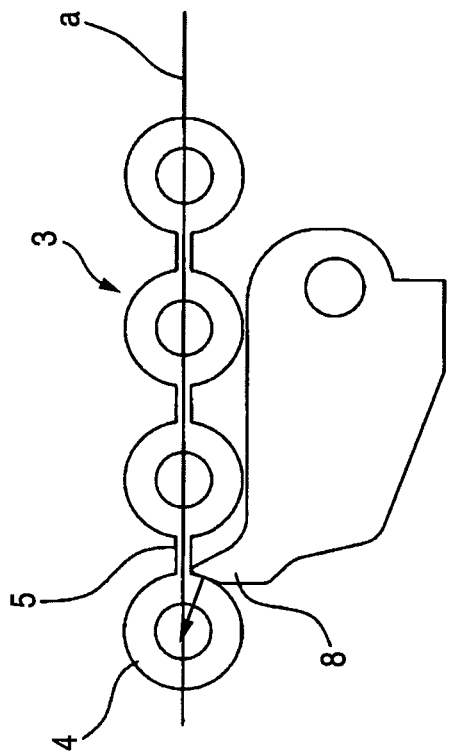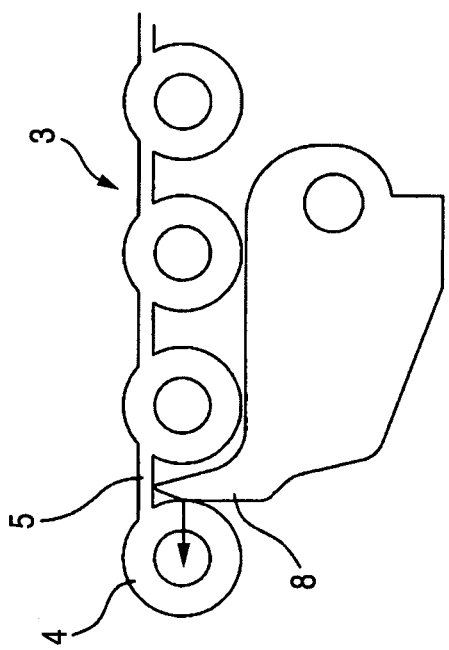

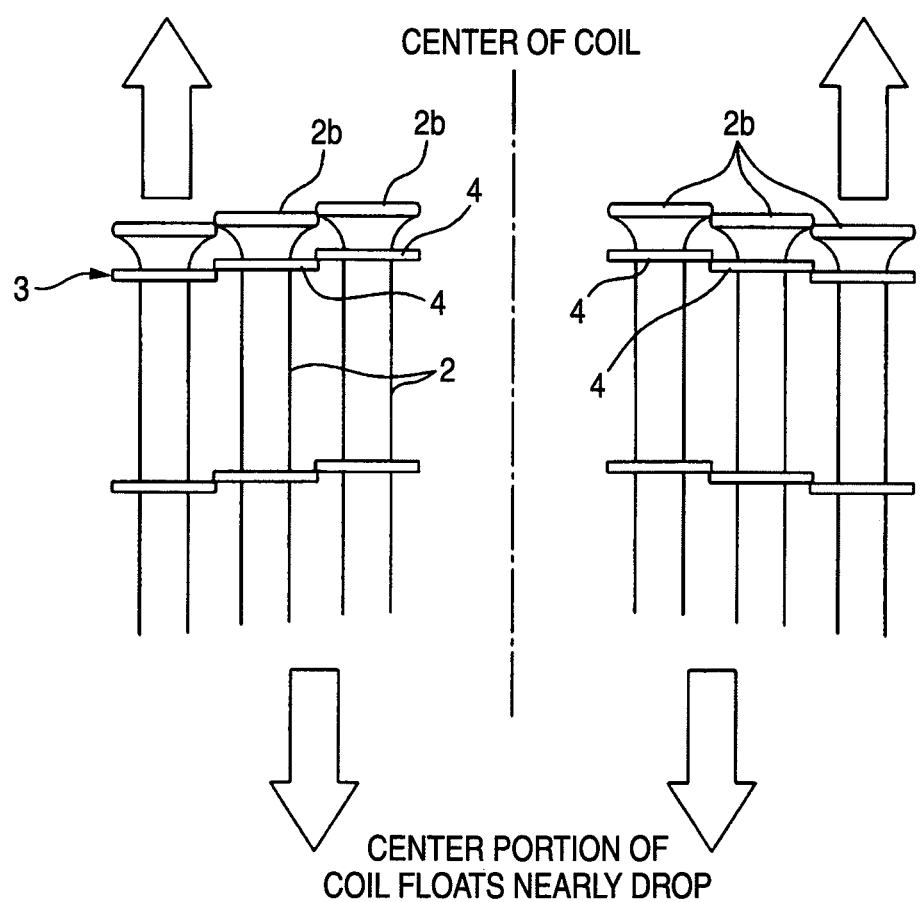

CONNECTED FASTENER ASSEMBLY

This application claims priority under 35 U.S.C. §119 to Japanese Patent Application No. JP2007-288920, filed on Nov. 6, 2008, which is incorporated by reference herein in its entirety.

FIELD OF THE INVENTION

The present invention relates to a connected fastener assembly for use in a fastener driving tool powered by pneumatic pressure, fuel gas, etc.

BACKGROUND OF THE INVENTION

A fastener driving tool for driving fasteners, such as nails, drive screws, etc. is a tool in which a connected fastener assembly connecting multiple connected fasteners is stored in a magazine and the fasteners are fed to the nose section of the driving tool sequentially beginning with the first fastener so that the fasteners are driven continuously into workpieces.

Such fasteners are used not only to anchor wood to wood, but also to fasten liners or wood to concrete, to secure I-beams to thin steel sheets and to fasten denz glass (a plaster board-like material) to studs.

As methods for connecting fasteners to form a connected fastener assembly, various methods are known: for example, a stick type connecting method in which multiple fasteners are integrally connected to a straight connecting band made of a synthetic resin, a wire connecting method in which the shaft sections of fasteners are connected using two parallel metal wires by welding, and the so-called plastic sheet connecting method in which retaining pieces provided at constant intervals are bent in the same direction so as to protrude from the upper and lower ends of a connecting band made of a synthetic resin and having a thin sheet shape and fasteners are inserted into the upper and lower retaining pieces. As an example of the synthetic resin connecting method, the method disclosed in Patent document 1 is known. In addition, as an example of the plastic sheet connecting method, the method disclosed in Patent document 2 is known. Furthermore, a method in which fasteners are connected using a connecting sheet made of a synthetic resin is also known. This connecting sheet comprises retaining sections for allowing the shaft sections of fasteners to be passed through and connecting sections for connecting adjacent retaining sections (refer to Patent documents 3 and 4).

[Patent document 1] Japanese Patent Application Laid-Open Publication No. Sho 57-120713
[Patent document 2] Japanese Utility Model No. 2526455
[Patent document 3] Japanese Patent Application Laid-Open Publication No. 2005-90723
[Patent document 4] Japanese Utility Model Application Laid-Open Publication No. Hei 6-35623

However, the connected fastener assembly in which multiple fasteners are integrally connected to a straight connecting band made of a synthetic resin so as to be formed into a stick shape has a problem of being unable to be wound into a coil.

In addition, in the case of the connected fastener assembly according to the wire connecting method, wires are scattered at the time of driving, whereby there is a danger of striking and injuring human bodies and garbage is produced. Furthermore, the shaft sections of the fasteners are welded to wires in this method. In the case that the fasteners are hardened nails, for example, the strength thereof is lowered at the welded portions by heat during welding. When such nails are driven into high-strength concrete or the like, the nails are likely to buckle or fracture. Moreover, if the connected fastener assembly wound into a coil is dropped to the floor or ground inadvertently when the connected fastener assembly is loaded into the magazine of a fastener driving tool, the exterior of the coil may be deformed. If the exterior is deformed, it is difficult to restore the coil into its original shape. Besides, when the connected fastener assembly wound into a coil is carried, a finger is inserted into the center hollow portion of the coil. In this case, there is a danger that the finger is injured by the tip ends of the wires.

On the other hand, in the case of the connected fastener assembly according to the plastic sheet connecting method, each fastener is detached from the connecting band and driven at the time of driving. It is thus necessary to form an ejection hole for ejecting the connecting band remaining in the nose section of a fastener driving tool. Hence, the strength of the nose section lowers, and the connecting band becomes garbage and must be thrown away.

Furthermore, the connected fastener assembly obtained according to the method disclosed in Patent documents 3 and 4 in which fasteners are connected using a connecting sheet made of a synthetic resin is simple in structure. However, the connecting sections for connecting the adjacent fasteners are formed along the center line connecting the centers of these fasteners. Hence, when the connected fastener assembly is wound into a coil, if the first wound portion of the coil, that is, the portion having the smallest winding diameter, is attempted to be wound as small as possible in diameter, the connecting sections must be bent at an acute angle. However, if bent at an acute angle, the connecting sections are subjected to large stress, thereby being lowered in strength and whitened. As a result, the connecting sections may be broken owing to vibration or impact at the time of driving, thereby causing improper feeding. If the connecting sections are made to have a sufficient length, the connecting sections can be bent so that a coil having a small diameter is obtained. However, the pitch between the fasteners increases, and there is a problem that the number of fasteners to be connected is reduced. In addition, if the connecting sections are disposed along the center line of the connecting band, when the connected fastener assembly is loaded into the magazine of a fastener driving tool, the tip end of the feeding pawl of the tool interferes with the connecting section and cannot engage the center of the retaining section of the connecting band, and improper feeding may occur.

SUMMARY OF THE INVENTION

The present invention provides an innovative connected fastener assembly capable of being wound into a coil having a small diameter at the start of winding, capable of securely obtaining sufficient connection strength and capable of comprising sufficient number of fasteners connected continuously.

According to a first aspect of the invention, a connected fastener assembly is provided with: a plurality of fasteners, and a connecting band made of a synthetic resin and connecting each of shaft sections of the plurality of fasteners, wherein the connecting band includes retaining sections for allowing the shaft sections of the fasteners to be inserted, and connecting sections for connecting adjacent retaining sections, and wherein the retaining sections and the connecting sections are continuously formed in the connecting band, and the connecting sections are offset from a center line connecting centers of the adjacent retaining sections.

According to a second aspect of the invention, the connecting sections may be offset on an outer circumferential side when the connecting band is wound into a coil.

According to a third aspect of the invention, the connecting sections may be formed so that a feeding pawl of a fastener driving tool can engage the retaining sections for feeding the fasteners.

According to a fourth aspect of the invention, both ends of each of the connecting sections may be provided along respective center line of the retaining sections, and a center portion of the each of the connecting section may be curved or bent so as to be offset.

According to a fifth aspect of the invention, the connecting sections may be offset so as to cross the center line.

According to a sixth aspect of the invention, one end of each of the connecting sections may be provided along a center line of one of the retaining sections and the other end of the retaining sections may be offset at a position away from a center line of the other retaining section.

According to a seventh aspect of the invention, a head section of each of the fasteners may be formed so as to have the same size as that of each of the retaining sections.

According to an eighth aspect of the invention, each of the retaining sections may be formed into a tubular shape, and each of the connecting sections may be formed so as to have the same height as that of each of the retaining sections.

According to a ninth aspect of the invention, a cylindrical portion to which each of the shaft sections is fitted may be formed by burring processing to continuously extend from each of the retaining sections.

According to a tenth aspect of the invention, a fragile portion may be formed in each of the connecting sections.

According to an eleventh aspect of the invention, a notch may be formed in each of the connecting sections on a side of the center line.

According to the first aspect, the retaining sections for allowing the shaft sections of the respective fasteners to be inserted and connecting sections for connecting the adjacent retaining sections are formed continuously, and the connecting sections are offset from the center line connecting the centers of the adjacent retaining sections. Hence, the length of the connecting section is longer than that of the connecting section that is provided along the center line although the distance between the retaining sections is the same. In the case that the length of the connecting section is long, the connecting section can be bent at an acute angle. When the connecting band is wound into a coil, the connecting sections can be bent and the connecting band can be wound so that the diameter of the coil at the start of winding on the center side of the coil becomes small, and the strength of the connecting sections in the bent state is obtained securely. In addition, since the distance between the retaining sections is not required to be lengthened, a sufficient quantity of the fasteners can be connected as a whole. Furthermore, since the retaining section is driven together with the fastener, the connecting section and the retaining section are not scattered and do not produce garbage at the time of driving.

In addition, in the case that a plurality of connecting bands are used to retain each fastener, the connecting bands can be disposed so as to have a distance therebetween, and the connecting bands can also be overlaid with each other, whereby the strength of the connection can be raised. Furthermore, in the case that the connecting bands are disposed such that the connecting sections thereof are offset reversely with respect to the center line, the connecting sections are provided on the left and right sides of the center line in the planar view. In this case, if the connected fastener assembly is attempted to be bent rightward or leftward, the connecting sections on the opposite side resist the bending, and it is thus difficult to bend the connected fastener assembly. Hence, a stick type of connected fastener assembly can be formed in this case. As described above, the connecting bands can be combined in various ways.

According to the second aspect, when the connecting band is wound into a coil, the connecting sections are offset on the outer circumferential side of the coil. Hence, the bending radius of the connecting sections when the connecting band is wound into a coil having a small diameter is smaller than that in the case that the connecting sections are offset on the opposite side. Therefore, the connecting band having the connecting sections can sufficiently meet conditions required for winding the connecting band into a coil having a small diameter at the start of winding.

According to the third aspect, the connecting sections are formed so that the feeding pawl of a fastener driving tool can engage the retaining sections and can carry out feeding. Hence, the feeding pawl can securely engage the opposite side (right behind) of the feeding side of the shaft section of the fastener and can securely feed the connected fastener assembly in the feeding direction.

According to the fourth aspect, although both ends of the connecting section are provided along the center line of the retaining sections, the effects of the invention can be obtained since the center portion of the connecting section is curved or bent so as to be offset.

According to the fifth or the sixth aspect, the connecting section becomes long as in the case of the offset configuration described above. Hence, the connected fastener assembly can be wound into a coil having a small diameter at the start of winding. In addition, since one end of the connecting section is positioned away from the feeding pawl, the fasteners can be fed securely in the feeding direction.

According to the seventh aspect, the head section of the fastener is formed so as to have the same size as that of the retaining section. Hence, when the fastener is fed to the nose section of the fastener driving tool, the head section and the retaining section can control the attitude of the shaft section of the fastener so as to guide the shaft section in the driving direction, whereby the fasteners can be driven in the proper direction at all times. Still further, although the retaining section is driven together with the fastener when the fastener is driven, since the retaining section is overlapped with the rear side of the head section of the fastener and is not exposed to the outside, the appearance of the fastener after the driving is excellent.

Furthermore, in the case that the connected fastener assembly is wound into a coil, when the winding is performed so that the head sections of the fasteners on the inner side make contact with those on the outer side, the density of the fasteners becomes low. For the purpose of solving this problem, the connected fastener assembly is wound so that the head section of the fastener on the outer side slightly enters below the head section of the fastener on the inner side. Hence, the coil is formed such that the center side becomes high and the outside becomes low. In this case, since the connected fastener assembly is wound so that the head section of the fastener on the outer side slightly enters below the head section of the fastener on the inner side, the connecting band is also wound so that the retaining section of the fastener on the outer side slightly enters below the retaining section of the fastener on the inner side and is overlapped therewith. Hence, when the coil is placed as a whole on a floor face or the like, the center portion of the coil floats from the floor face or the like but does not drop since the retaining sections of the connecting band are overlapped with each other. For this reason, when the connected fastener assembly wound into a coil is held by hand, the coil is not deformed.

According to the eighth aspect, the retaining section is formed into a tubular shape. Hence, the shaft section of the fastener can be held firmly. In addition, since the connecting section is formed so as to have the same height as that of the retaining section, the strength of the connecting section becomes very large.

According to the ninth aspect, a cylindrical portion for allowing the shaft section of the fastener to be fitted is formed continuously in the retaining section by burring processing. Hence, even in the case that the connecting band is formed of a sheet made of a synthetic resin, since the shaft section of the fastener is fitted into the cylindrical portion, the fastener can be held with a large retaining force, and the performance of guiding the fastener at the time of driving can be enhanced.

According to the tenth aspect, a fragile portion is formed in the connecting section. Hence, when the connecting band of the connected fastener assembly is wound into a coil, the connecting section is bent at the fragile portion at the start of winding. The connecting section is thus bent easily at an acute angle. Furthermore, since each of the connecting sections of the connecting band is broken at the notch at the time of driving, the breaking point is located stably at a predetermined position. Hence, when the fastener is driven, the broken connecting sections protrude on both sides of the retaining section by the same length. As a result, the states of the fasteners after the driving are uniform and excellent in appearance.

According to the eleventh aspect, the same effects from the fragile portion being formed in the connection sections can be obtained. In particular, since the notch is formed in the connecting section on the side of the center line, the connecting sections can be bent at an acute angle at the start of winding of the connecting band.

Other aspects and advantages of the invention will be apparent from the following description, the drawings and the claims.

BRIEF DESCRIPTION OF THE DRAWINGS

FIGS. 4(a) is a explanatory view showing the state of the connecting band of the connected fastener assembly being fed using a feeding pawl in the case of the connecting band with offset connecting sections and 4(b) is a explanatory view showing the state of the connecting band of the connected fastener assembly being fed using a feeding pawl in the case of the connecting band with connecting sections provided along the center line of the retaining section.

FIG. 6 is an explanatory view showing the connected fastener assembly wound into a coil, cross-sectioned in the diametric direction.

Figure 1:
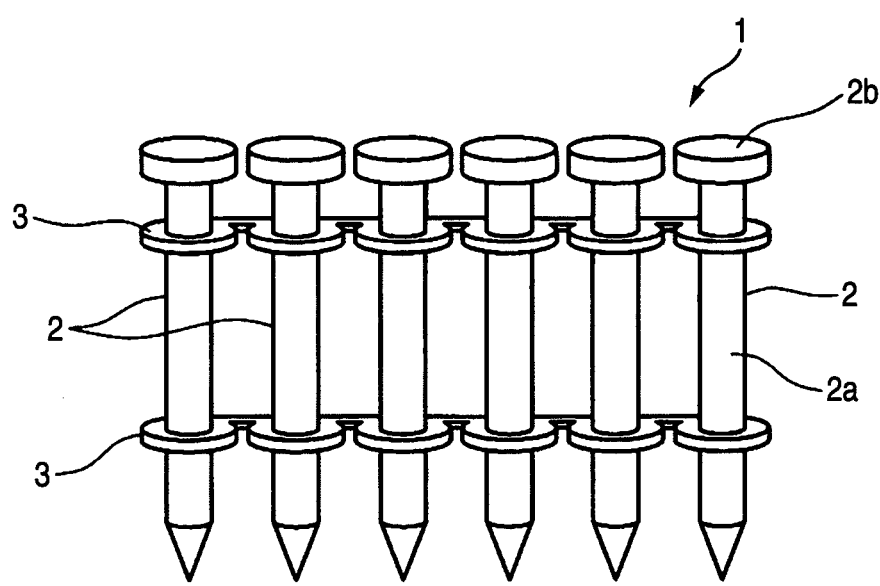
FIG. 1 is a perspective view showing a connected fastener assembly according to the present invention.
Figure 2A:
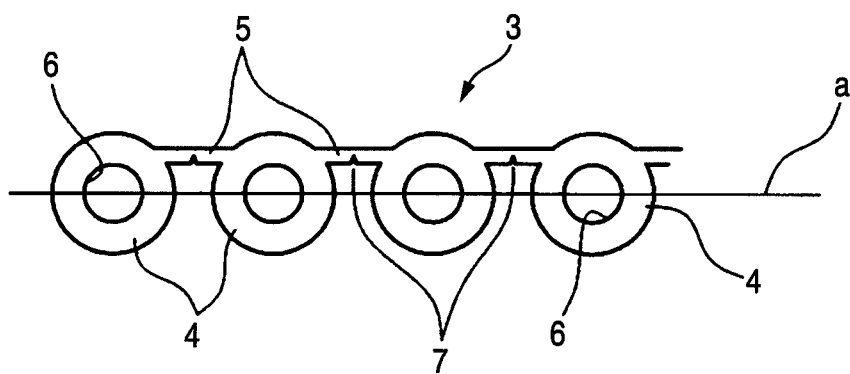
FIG. 2(a) is a plan view showing the connecting band of the connected fastener assembly having fragile portions.

DETAILED DESCRIPTION OF THE PREFERRED EMBODIMENTS 1 connected fastener assembly
2 fastener
3 connecting band
4 retaining section
5 connecting section
7 notch In FIG. 1, numeral 1 designates a connected fastener assembly. This connected fastener assembly 1 is formed by connecting the shaft sections 2a of multiple fasteners 2 (concrete pins) using connecting bands 3. The connecting band 3 is obtained by press molding a band-shaped connecting sheet made of a synthetic resin, such as polyethylene, wherein a retaining section 4 for allowing the shaft section 2a of the fastener 2 to be inserted and a connecting section 5 for connecting the adjacent retaining sections 4 are formed continuously as shown in FIG. 2A.

The retaining section 4 is circular in outer shape and is formed to have the same size as that of the head section 2b of the fastener 2. A fitting hole 6 for allowing the shaft section 2a of the fastener 2 to be fitted therein is formed at the center portion of the retaining section 4.

The connecting section 5 is used to connect the adjacent retaining sections 4 and to retain the distance between the adjacent retaining sections 4. The connecting section 5 is provided at a position offset from the center line "a" connecting the centers of the adjacent fasteners 2 (or retaining sections 4).

Figure 2B:
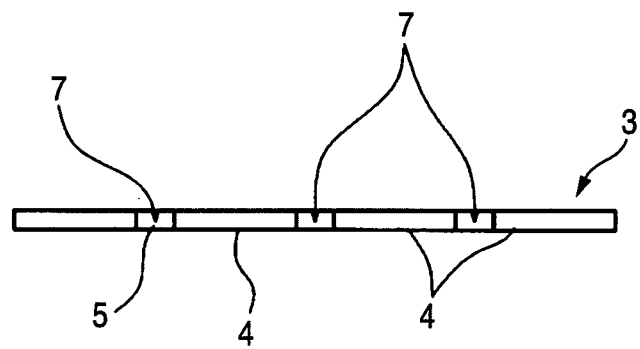
FIG. 2(b) is a front view showing a connecting band having fragile portions according to another embodiment.

A fragile portion is formed in the connecting section 5. The fragile portion may be formed by reducing the thickness of the connecting section 5 or by providing a through hole in the connecting section 5. However, it is preferable that a notch 7 is formed in the connecting section 5 on the side of the center line "a". With the notches 7 provided in the connecting sections 5, the connecting band 3 is likely to bend at the notches 7 when the connecting band 3 is wound into a coil, and stress is likely to concentrate in the notches 7 when the connecting sections 5 are pulled. The notches 7 may also be formed on the opposite side of the center line "a". Furthermore, the notches 7 serving as fragile portions may also be formed on the upper faces (or the lower faces) of the connecting sections 5 as shown in FIG. 2B.

The connected fastener assembly 1 shown in FIG. 1 can be obtained by fitting the fasteners 2 into the fitting holes 6 of the connecting bands 3 configured as described above and by retaining the fasteners 2 therein. The connecting bands 3 are usually provided on the upper and lower sides of the fasteners 2.

As described above, since the connecting section 5 is provided at a position offset from the center line "a" connecting the centers of the adjacent fasteners 2, the length of the connecting section 5 is longer than that of the connecting section that is provided along the center line "a" although the distance between the retaining sections 4 is the same. In the case that the length of the connecting section 5 is long, the connecting section 5 can be bent at an acute angle. Hence, when the connecting band 3 is wound into a coil, the connecting sections 5 can be bent and the connecting band 3 can be wound so that the diameter of the coil at the start of winding on the center side of the coil becomes small, and the strength of the connecting sections 5 in the bent state is obtained securely. In addition, since the distance between the retaining sections 4 is not required to be lengthened, a sufficient quantity of the fasteners 2 can be connected as a whole. Furthermore, since the connecting section 5 is broken at the time of driving the fastener 2 and the retaining section 4 is driven together with the fastener 2 (see FIG. 7B), the connecting section 5 and the retaining section 4 are not scattered and do not produce garbage at the time of driving. Moreover, since the nose section of a fastener driving tool is not required to be provided with a hole for ejecting the connecting band 3, the strength of the nose portion is not impaired.

Still further, when the connecting band 3 is wound into a coil, the connecting sections 5 are offset on the outer circumferential side of the coil. Hence, the bending radius of the connecting sections 5 when the connecting band 3 is wound into a coil having a small diameter is smaller than that in the case that the connecting sections 5 are offset on the opposite side. Therefore, the connecting band 3 having the connecting sections 5 can sufficiently meet conditions required for winding the connecting band 3 into a coil having a small diameter at the start of winding.

Figure 3A:
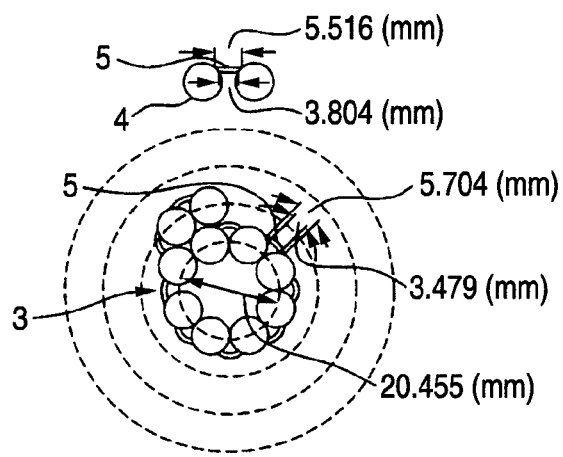
FIGS. 3(a), 3(b) and 3(c) are explanatory views showing the diameter of the coil of the connecting band at the start of winding in which the connecting band with offset connecting sections is compared with the connecting band with connecting sections provided along the center line of the retaining section.

The case in which the connecting section 5 is offset is compared with the case in which the connecting section 5 is disposed along the center line "a" as described below. As shown in FIG. 3A, when the length of the offset connecting section 5 of the connecting band 3 on the outer circumferential side was 5.516 mm and the length thereof on the inner circumferential side was 3.804 mm, the connecting band 3 was begun to be wound into a coil so that the retaining sections 4 made contact with each other and so that the diameter of the coil became 20.455 mm. When the length of the connecting section 5 was measured, the length on the outer circumferential side was 5.704 mm, and the length on the inner circumferential side was 3.479 mm. Hence, the elongations on the outer and inner circumferential sides are as described below.

Outer circumferential side: 5.516 (mm)→5.704 (mm) . . . 1.034 times

Inner circumferential side: 3.804 (mm)→3.479 (mm) . . . 0.915 times

Figure 3B:
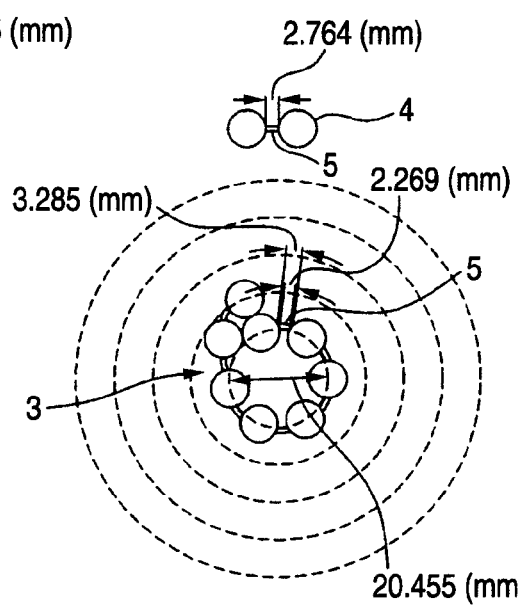

On the other hand, in the case that the connecting section 5 of the connecting band 3 is disposed along the center line "a" and when the length of the connecting section 5 was 2.764 mm, the connecting band 3 was begun to be wound into a coil so that the retaining sections 4 made contact with each other and so that the diameter of the coil became 20.455 mm as shown in FIG. 3B. When the length of the connecting section 5 was measured, the length on the outer circumferential side was 3.285 mm, and the length on the inner circumferential side was 2.269 mm. Hence, the elongations on the outer and inner circumferential sides are as described below.

Outer circumferential side: 2.764 (mm)→3.285 (mm) . . . 1.19 times

Inner circumferential side: 2.764 (mm)→2.269 (mm) . . . 0.82 times

A considerably large force is required to deform the connecting section 5 by 20% or more. In addition, when the winding start portion of the connecting band 3 is withdrawn from a magazine, the connecting section 5 must be restored to a shape nearly close to its original shape. However, if the connecting section 5 has been deformed by 20% or more, the connecting section 5 is not restored to its original shape but remains elongated. Hence, the distance between the retaining sections 4, that is, the distance between the fasteners 2 becomes larger than a predetermined distance. As a result, the retaining sections 4 cannot properly engage the feeding pawl of the fastener driving tool, and improper feeding may occur.

Figure 3C:
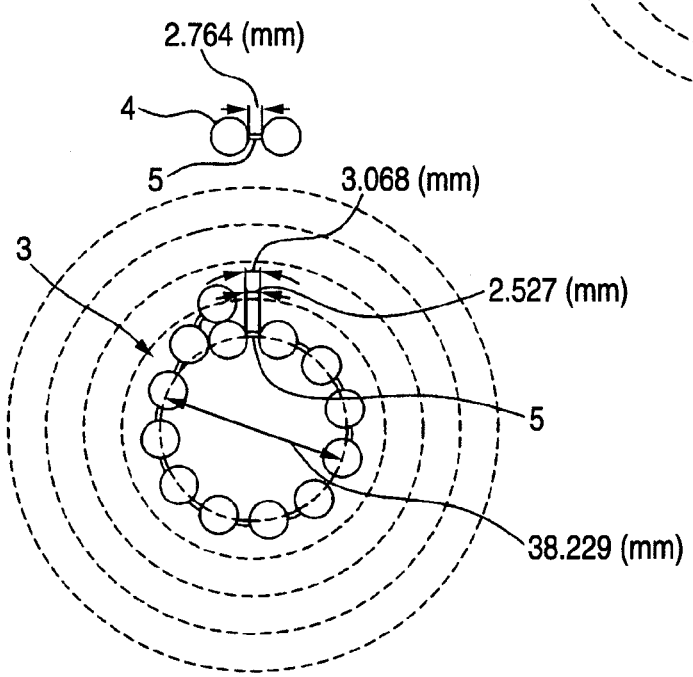

Hence, the elongations on the outer and inner circumferential sides were set as described below so that the ratios of the elongations at the start of winding were similar to those obtained in the case of the offset connecting section 5 as shown in FIG. 3C.

Outer circumferential side: 2.764 (mm)→3.086 (mm) . . . 1.11 times

Inner circumferential side: 2.764 (mm)→2.527 (mm) . . . 0.91 times

In this case, the diameter of the coil at the start of winding became a large value of 38.229 mm, and a wasteful portion was formed at the center.

It is preferable that the connecting section 5 should be offset to the extent that the feeding pawl of the fastener driving tool can engage the center portion of the retaining section 4 in the feeding direction. In other words, it is preferable that the connecting section 5 should be configured so that the feeding pawl of the fastener driving tool can engage the retaining section 4 and can feed the connected fastener assembly 1. With this configuration, as shown in FIG. 4A, the feeding pawl 8 can securely engage the opposite side (right behind) of the feeding side of the shaft section 2a of the fastener 2 and can securely feed the connected fastener assembly 1 in the feeding direction. When the connecting section 5 is disposed along the center line "a", the tip end of the feeding pawl 8 interferes with the connecting section 5 and cannot engage the center of the retaining section 4 as shown in FIG. 4B. Hence, the actual direction of feeding by the feeding pawl 8, indicated by the arrow in the figure, is dislocated from the direction along the center line "a", and improper feeding may occur.

Figure 5:
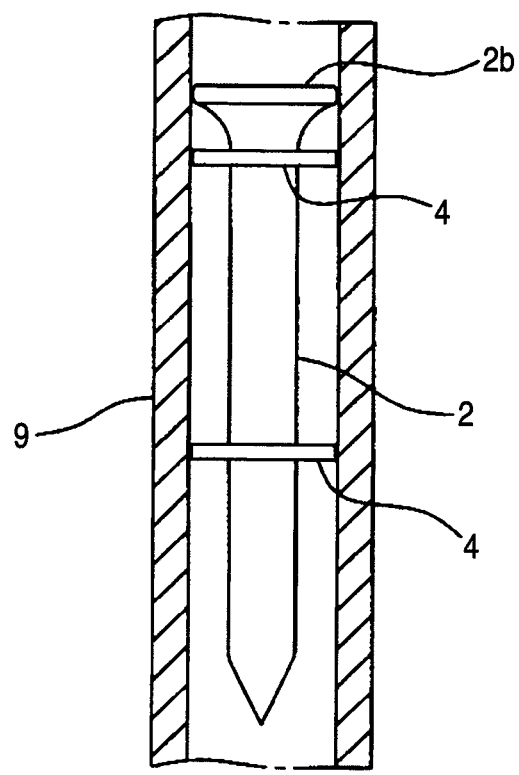
FIG. 5 is a sectional view showing the state of a fastener inside a nose section.

Furthermore, since the head section 2b of the fastener 2 is formed so as to have the same as that of the retaining section 4, when the fastener 2 is fed to the nose section 9 of the fastener driving tool, the head section 2b and the retaining sections 4 are fitted into the nose section 9 as shown in FIG. 5. As a result, the attitude of the shaft section 2a of the fastener 2 can be controlled so as to be guided in the driving direction, whereby the fastener 2 can be driven in the proper direction at all times.

Furthermore, in the case that the connected fastener assembly 1 is wound into a coil, when the winding is performed so that the head sections 2b of the fasteners 2 on the inner side make contact with those on the outer side, the density of the fasteners 2 becomes low. For the purpose of solving this problem, the connected fastener assembly 1 is wound so that the head section 2*b* of the fastener 2 on the outer side slightly enters below the head section 2*b* of the fastener 2 on the inner side as shown in FIG. 6. Hence, the coil is formed such that the center side becomes high and the outside becomes low. In this case, since the connected fastener assembly 1 is wound so that the head section 2*b* of the fastener 2 on the outer side slightly enters below the head section 2*b* of the fastener 2 on the inner side, the connecting band 3 is also wound so that the retaining section 4 of the fastener 2 on the outer side slightly enters below the retaining section 4 of the fastener 2 of the fastener 2 on the inner side and is overlapped therewith. Hence, when the coil is placed as a whole on a floor face or the like, the center side portion of the coil floats from the floor face or the like but does not drop since the retaining sections 4 of the connecting band 3 are overlapped with each other as described above. For this reason, when the connected fastener assembly 1 wound into a coil is held by hand, the coil is not deformed. Moreover, since the connecting band 3 is made of a synthetic resin, it is safer than that made of wires.

Still further, although the retaining section 4 is driven together with the fastener 2 when the fastener 2 is driven, since the retaining section 4 is overlaid with the rear side of the head section 2*b* of the fastener 2 and is not exposed to the outside, the appearance of the fastener 2 after the driving is excellent.

Figure 7A:
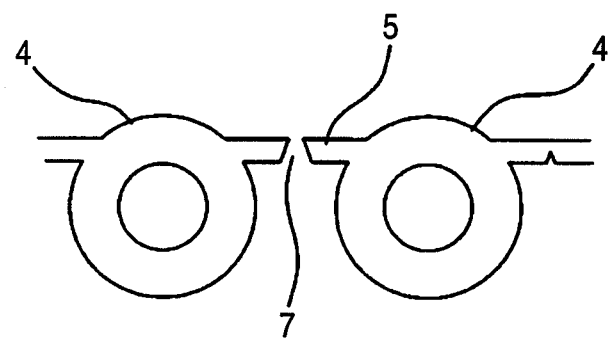
FIG. 7(a) is a plan view showing the broken state of the connecting section provided with a notch.
Figure 7B:
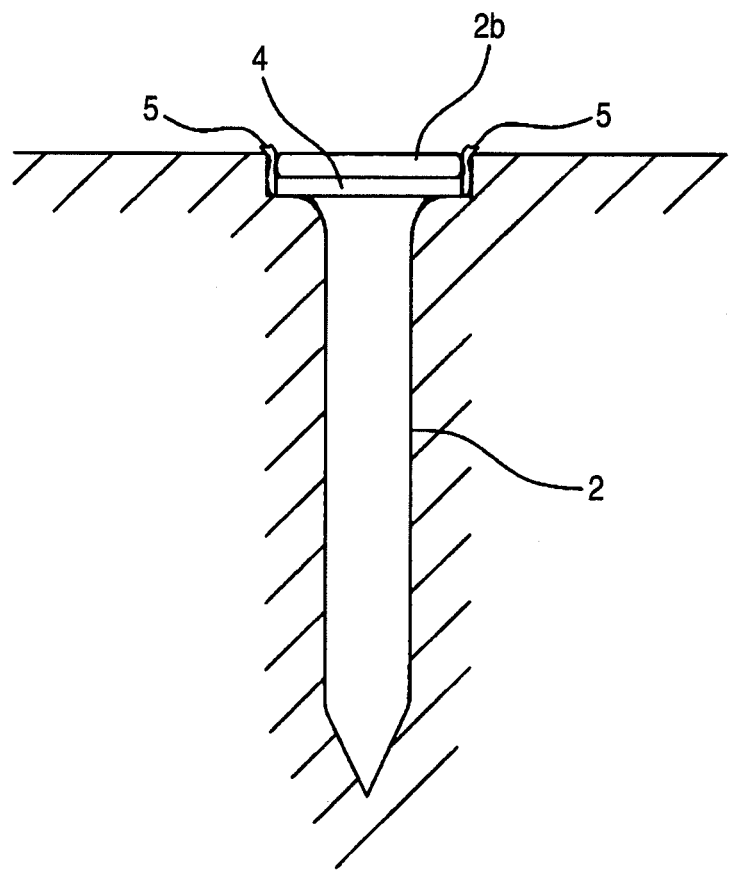
FIG. 7(b) is a sectional view showing the state of the fastener driven into a workpiece.

Since the connecting band 3 is bent easily at the notches 7 when it is wound into a coil, the connecting band 3 can be bent easily at an acute angle at the start of winding. Furthermore, since each of the connecting sections 5 of the connecting band 3 is broken at the notch 7 at the time of driving as shown in FIG. 7A, the breaking point is located stably at a predetermined position. Hence, when the fastener 2 is driven as shown in FIG. 7B, the broken connecting sections 5 protrude on both sides of the retaining section 4 by the same length. As a result, the amounts of the connecting sections 5 sticking out from the head section 2*b* of the fastener 2 decrease, and the states of the fasteners 2 after the driving are uniform and excellent in appearance. Fastener feeding is also stabilized.

Figure 8A:
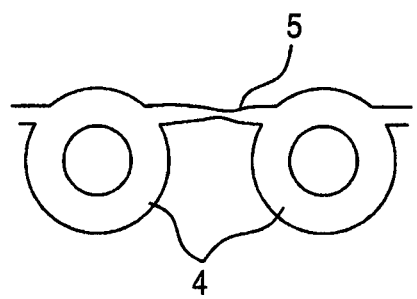
FIGS. 8(a) and 8(b) are plan views showing the broken states of the connecting section provided with no notch.
Figure 8B:
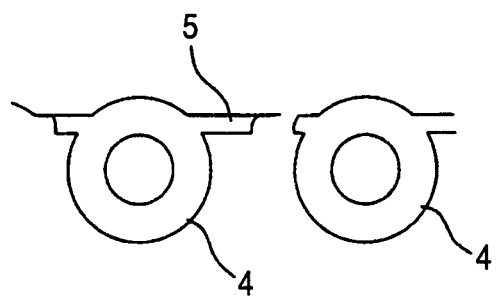
Figure 8C:
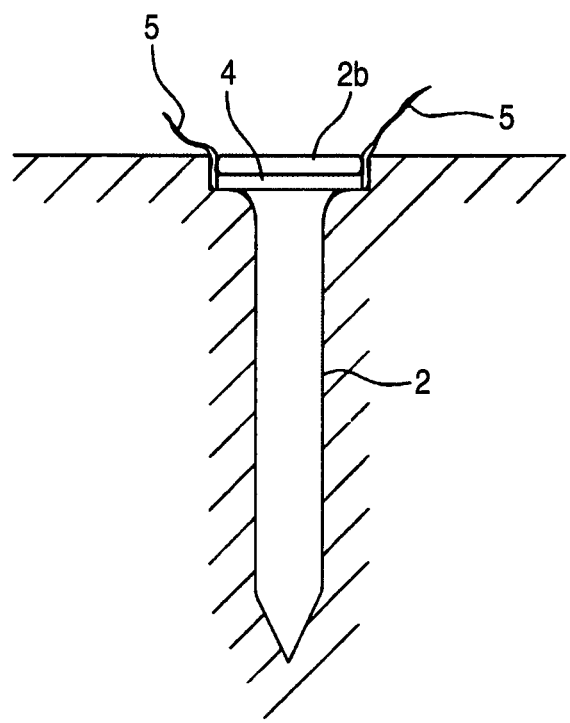
FIG. 8(c) is a sectional view showing the state of the fastener driven into a workpiece.

On the other hand, if the notch 7 is not formed, as shown in FIGS. 8A and 8B, the connecting section 5 between the fastener 2 having been driven at the time of driving and the next fastener 2 is broken after it is pulled and elongated, and the breaking point is not located stably. Hence, when the fastener 2 is driven as shown in FIG. 8C, the amounts of the connecting sections 5 sticking out from the retaining section 4 increase, and the sticking portions are different in length. Hence, the states of the fasteners 2 after the driving are irregular and are not good in appearance. In particular, in the case of denz glass processing, "whisker-like" portions sticking out from the surfaces of workpieces are not permitted. Hence, the effects of the notch 7 are significant in this kind of processing. Furthermore, if the connecting section 5 is elongated and is difficult to cut, the attitude of the fastener 2 becomes unstable, and improper feeding may occur.

Figure 9A:
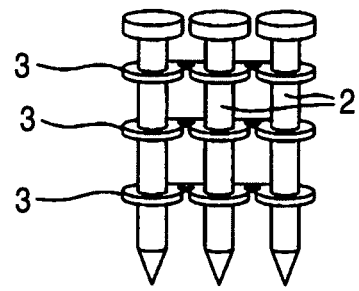
FIGS. 9(a) to 9(e) are perspective views showing the connected states of the fasteners.
Figure 9B:
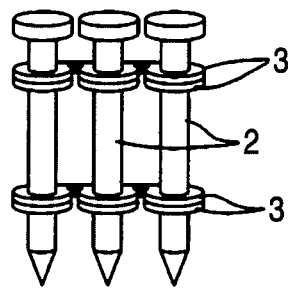
Figure 9C:
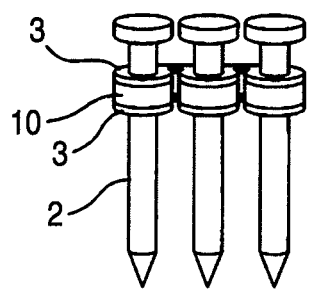
Figure 9D:
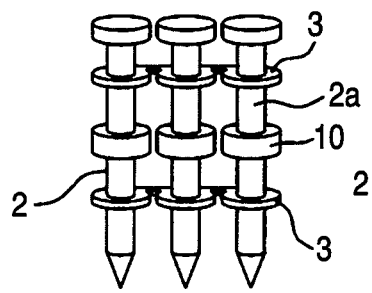
Figure 9E:
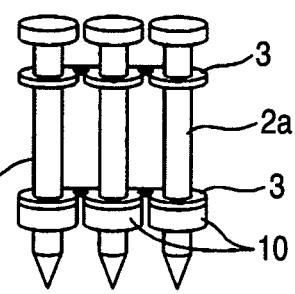

Moreover, although the connecting bands 3 having the above-mentioned configuration are usually used to connect the upper and lower portions of the fasteners 2, the connecting bands 3 can be combined in various ways. For example, FIG. 9A shows the fasteners 2 that are connected using three (upper, intermediate and lower) connecting bands 3, and FIG. 9B shows the fasteners 2 that are connected using an upper combination of connecting bands 3 and a lower combination of connecting bands 3, each combination being formed of two connecting bands 3. FIG. 9C shows the fasteners 2 that are connected such that tubes 10, made of a synthetic resin and used to guide the fasteners 2 at the time of driving, are held between the upper connecting band 3 and the lower connecting band 3. FIG. 9D shows the fasteners 2 that are connected such that tubes 10 are fitted on the center portions of the shaft sections 2*a* and such that the upper connecting band 3 and the lower connecting band 3 are provided at the upper and lower portions of the fasteners 2 with a distance provided therebetween. Furthermore, FIG. 9E shows the fasteners 2 that are connected such that tubes 10 are fitted on the lower portions of the shaft sections 2*a* of the fasteners 2 and the lower connecting band 3 is provided on the tubes 10 and such that the upper connecting band 3 is further provided at the upper portions of the shaft sections 2*a* of the fasteners 2.

Figure 10A:
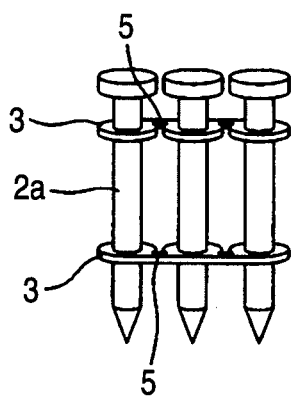
FIGS. 10(a), 10(b) and 10(c) are perspective views showing the connected states of the fasteners with the connecting bands alternately turned upside down.
Figure 10B:
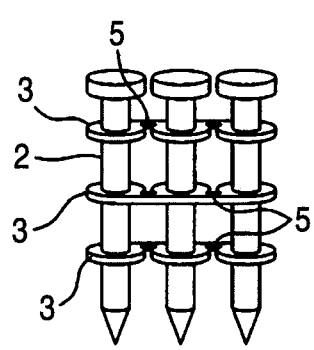
Figure 10C:
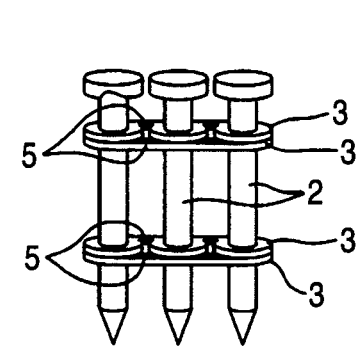

Besides, FIG. 10A shows the fasteners 2 that are connected such that the upper connecting band 3 and the lower connecting band 3 are provided so that the positions of the connecting sections 5 of the upper connecting band 3 are opposite to those of the lower connecting band 3. With this configuration, if a force is applied to bend either one of the upper and lower connecting sections 5, the other connecting section 5 acts to prevent the bending. Hence, the connected fastener assembly 1 can be connected in a stick shape that is bent neither to the left nor to the right. In this case, as shown in FIG. 10B, the fasteners 2 may be connected using three (upper, intermediate and lower) connecting bands 3 provided such that the connecting bands 3 are alternately turned upside down. Still further, as shown in FIG. 10C, the fasteners 2 may be connected using an upper combination of connecting bands 3 and a lower combination of connecting bands 3, each combination being formed of two connecting bands 3 overlaid in opposite directions from each other to enhance strength.

Figure 11A:
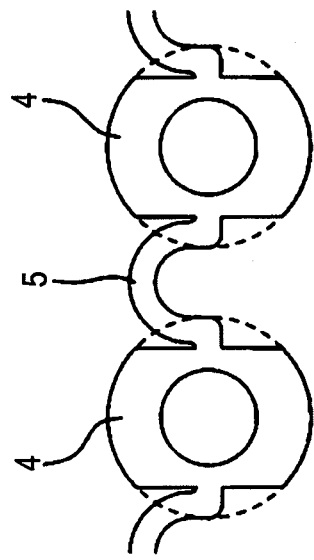
FIGS. 11(a) and 11(b) are explanatory views showing offset connecting sections according to other embodiments.
Figure 11B:
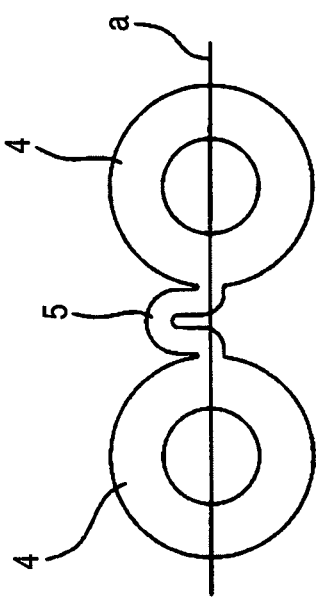

Furthermore, even in the case that both ends of the connecting section 5 are provided along the center line "a" of the retaining sections 4, the center portion of the connecting section 5 may be curved or bent so as to be offset. For example, as shown in FIG. 11A, even in the case that both ends of the connecting sections 5 are provided along the center line "a" of the retaining sections 4, the center portion of the connecting section 5 may be curved into a U-shape or bent into a V-shape. In this case, it is preferable that the front and rear portions of the retaining sections 4 in the connection direction should be cut off as shown in FIG. 11B, so that a space for allowing the feeding pawl 8 to perform engagement is formed at the center portion of the connecting section 5. Even in this case, effects similar to those described above can also be obtained.

Figure 12A:
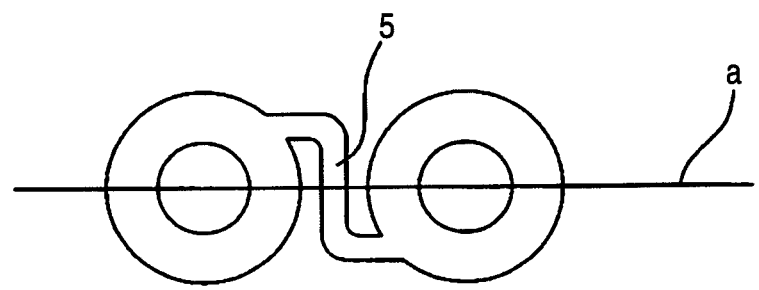
FIGS. 12(a) and 12(b) are explanatory views showing offset connecting sections according to still other embodiments.
Figure 12B:
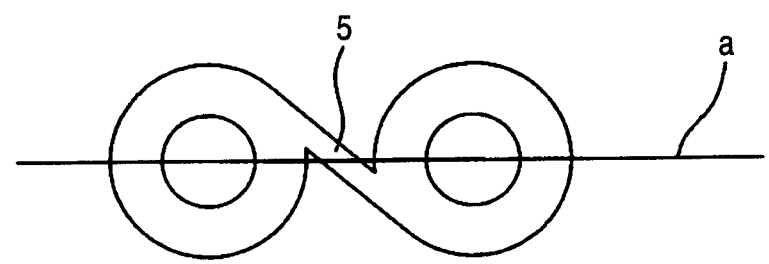

Similarly, the connecting section 5 may also be offset so as to cross the center line "a". For example, the connecting section 5 may be formed into a Z-shape as shown in FIG. 12A. Furthermore, the connecting section 5 may also be formed into the shape of an inclined line as shown in FIG. 12B.

In the offset configurations described above, since the connecting section 5 is offset so as to cross the center line "a", the connecting section 5 becomes long as in the case of the offset configuration described earlier. Hence, the connected fastener assembly 1 can be wound into a coil having a small diameter at the start of winding. In addition, since one end of the connecting section 5 is positioned away from the feeding pawl, the fasteners can be fed securely.

Figure 13:
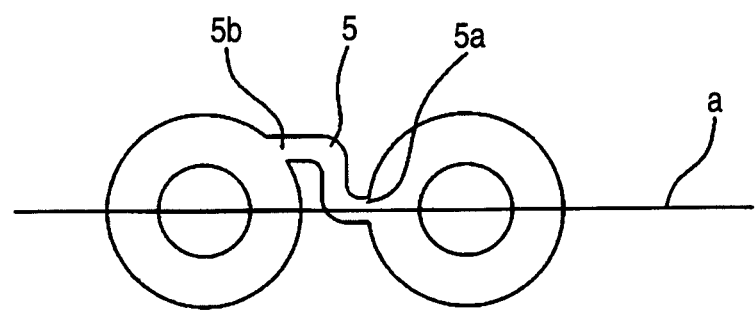
FIG. 13 is an explanatory view showing an offset connecting section according to yet still another embodiment.

Furthermore, as shown in FIG. 13, one end 5*a* of the connecting section 5 may be provided along the center line "a" of one of the adjacent retaining sections 4 and the other end 5*b* thereof may be offset from the center line "a" of the other retaining section 4. With this offset configuration, the connecting section 5 also becomes long as in the case of the above-mentioned offset configurations. Hence, the connected fastener assembly 1 can be wound into a coil having a small diameter at the start of winding. In addition, since one end of the connecting section 5 is positioned away from the feeding pawl, the fasteners can be fed securely.

Figure 14:
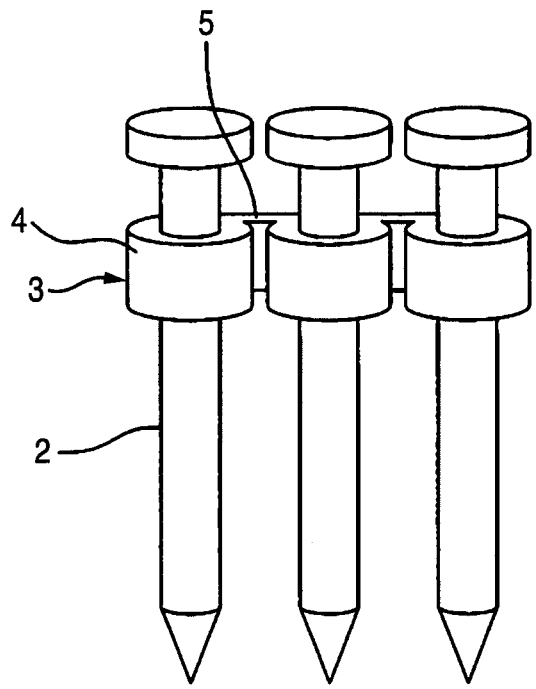
FIG. 14 is a perspective view showing a connecting band according to a further embodiment.

Moreover, the connecting band 3 may also be formed of a thick sheet made of a synthetic resin and pressed. In the case that the connecting section 5 is formed of this kind of sheet, the retaining section 4 is formed into a tubular shape and the height of the connecting section 5 becomes large as shown in FIG. 14. Hence, the shaft section 2a of the fastener 2 can be held firmly. In addition, since the connecting section 5 is formed so as to have the same height as that of the retaining section 4, the strength of the connecting section 5 becomes very large.

Figure 15:
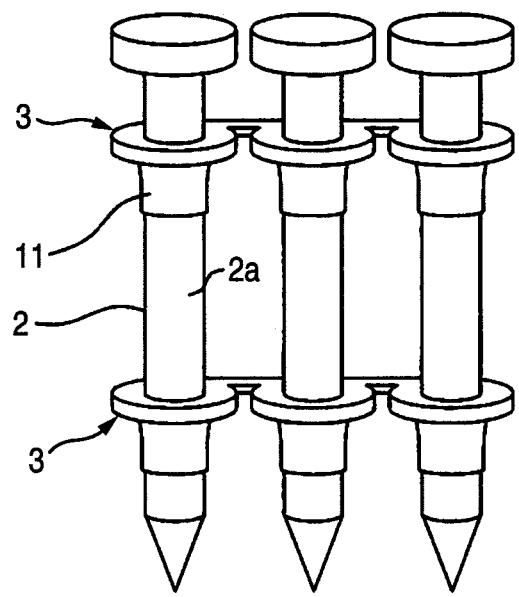
FIG. 15 is a perspective view showing a connecting band according to a still further embodiment.

Still further, when the connecting band 3 configured as described above is produced by press working, a cylindrical portion for allowing the shaft section of the fastener to be fitted may be formed continuously in the retaining section by burring processing as shown in FIG. 15. With this configuration, even in the case that the connecting band 3 is formed of a sheet made of a synthetic resin, when the shaft section 2a of the fastener 2 is fitted into the cylindrical portion 11, the fastener 2 can be held with a large retaining force, and the performance of guiding the fastener 2 at the time of driving can be enhanced.

As described above, the present invention can provide a non-conventional and innovative connected fastener assembly to the market.

While the invention has been described in connection with the exemplary embodiments, it will be obvious to those skilled in the art that various changes and modifications may be made therein without departing form the present invention, and it is aimed, therefore, to cover in the appended claim all such changes and modifications as fall within the true spirit and scope of the present invention.

The invention claimed is:

1. A connected fastener assembly comprising:
a plurality of fasteners; and
a connecting band made of a synthetic resin and connecting each of shaft sections of the plurality of fasteners,
the connecting band comprising:
retaining sections for allowing the shaft sections of the fasteners to be inserted, and
connecting sections for connecting adjacent retaining sections without overlapping an outermost line connecting outermost portions of the adjacent retaining sections when the fasteners are arranged linearly,
wherein the retaining sections and the connecting sections are continuously formed in the connecting band, and at least a portion of each of the connecting sections is offset from a center line connecting centers of the adjacent retaining sections, and a head section of each of the fasteners has the same size as that of each of the retaining sections so as not to expose the retaining sections to the outside when the fasteners are driven, and
wherein a notch is formed in each of the connecting sections on a side of the center line.

2. The connected fastener assembly according to claim 1, wherein the connecting sections are formed so that a feeding pawl of a fastener driving tool can engage the retaining sections for feeding the fasteners.

3. The connected fastener assembly according to claim 1, wherein each of the retaining sections is formed into a tubular shape, and each of the connecting sections is formed so as to have the same height as that of each of the retaining sections.

4. A connected fastener assembly comprising:
a plurality of fasteners; and
a connecting band made of a synthetic resin and connecting each of shaft sections of the plurality of fasteners;
the connecting band comprising:
retaining sections for allowing the shaft sections of the fasteners to be inserted; and
connecting sections for connecting adjacent retaining sections,
wherein the retaining sections and the connecting sections are continuously formed in the connecting band, and at least a portion of each of the connecting sections is offset from a center line connecting centers of the adjacent retaining sections, and a head section of each of the fasteners has the same size as that of each of the retaining sections so as not to expose the retaining sections to the outside when the fasteners are driven, and
wherein both ends of each of the connecting sections are provided along respective center lines of the retaining sections, and a center portion of each of the connecting sections is curved or bent so as to be offset from the center line.

5. A connected fastener assembly comprising:
a plurality of fasteners; and
a connecting band made of a synthetic resin and connecting each of shaft sections of the plurality of fasteners;
the connecting band comprising:
retaining sections for allowing the shaft sections of the fasteners to be inserted; and
connecting sections for connecting adjacent retaining sections,
wherein the retaining sections and the connecting sections are continuously formed in the connecting band, and at least a portion of each of the connecting sections is offset from a center line connecting centers of the adjacent retaining sections, and a head section of each of the fasteners has the same size as that of each of the retaining sections so as not to expose the retaining sections to the outside when the fasteners are driven, and
wherein both ends of each of the connecting sections are offset from the center line and a center portion of each of the connecting sections crosses the center line.

6. A connected fastener assembly comprising:
a plurality of fasteners; and
a connecting band made of a synthetic resin and connecting each of shaft sections of the plurality of fasteners;
the connecting band comprising:
retaining sections for allowing the shaft sections of the fasteners to be inserted; and
connecting sections for connecting adjacent retaining sections,
wherein the retaining sections and the connecting sections are continuously formed in the connecting band, and at least a portion of each of the connecting sections is offset from a center line connecting centers of the adjacent retaining sections, and a head section of each of the fasteners has the same size as that of each of the retaining sections so as not to expose the retaining sections to the outside when the fasteners are driven, and
wherein one end of each of the connecting sections is provided along a center line of one of the retaining sections and the other end of each of the connecting sections is offset at a position away from a center line of the other retaining section.

7. The connected fastener assembly according to any one of claims 1, 4, and 6, wherein the connecting sections are offset on an outer circumferential side when the connecting band is wound into a coil.

8. A connected fastener assembly comprising:
a plurality of fasteners; and
a connecting band made of a synthetic resin and connecting each of shaft sections of the plurality of fasteners;
the connecting band comprising:
retaining sections for allowing the shaft sections of the fasteners to be inserted; and
connecting sections for connecting adjacent retaining sections without overlapping an outermost line connecting outermost portions of the adjacent retaining sections when the fasteners are arranged linearly,
wherein the retaining sections and the connecting sections are continuously formed in the connecting band, and at least a portion of each of the connecting sections is offset from a center line connecting centers of the adjacent retaining sections, and a head section of each of the fasteners has the same size as that of each of the retaining sections so as not to expose the retaining sections to the outside when the fasteners are driven, and
wherein each of the retaining sections is circular in outer shape.

* * * * *